United States Patent [19]

Meade

[11] Patent Number: 4,999,126

[45] Date of Patent: Mar. 12, 1991

[54] FUMED SILICA AS A PAINT STRIPPER THICKENER

[75] Inventor: Robert J. Meade, Naperville, Ill.

[73] Assignee: Nalco Chemical Company, Naperville, Ill.

[21] Appl. No.: 226,481

[22] Filed: Aug. 1, 1988

[51] Int. Cl.$^5$ .......................... C09D 9/00; C09D 9/02
[52] U.S. Cl. ..................................... 252/162; 252/167; 252/163; 252/172; 252/DIG. 8; 134/38
[58] Field of Search .................. 252/DIG. 8, 162, 167, 252/163, 172; 134/38

[56] References Cited

U.S. PATENT DOCUMENTS

| | | | |
|---|---|---|---|
| 2,913,418 | 11/1959 | Sohngen et al. | 252/DIG. 8 |
| 3,115,471 | 12/1963 | Matsuka et al. | 252/164 |
| 3,355,385 | 11/1967 | Mackley | 252/104 |
| 3,956,162 | 5/1976 | Lautenberger | 252/170 |
| 4,336,072 | 6/1982 | Moore et al. | 134/38 |

OTHER PUBLICATIONS

The Colloid Chemistry of Silica and Silicates, by Ralph K. Iler, published by Cornell University Press, 1955.
McCutcheon's "Emulsifiers & Detergents"/North American, 1983 p. 274.

*Primary Examiner*—Josephine Barr
*Attorney, Agent, or Firm*—John S. Roberts, Jr.; Donald G. Epple; Anthony L. Cupoli

[57] ABSTRACT

A method of removing acrylic paints from the surfaces of paint spray booths which comprises the steps of (A) Coating the painted surfaces of paint spray booths with a thickened aromatic solvent paint stripper consisting essentially of:

| Ingredients | % by Weight |
|---|---|
| Aromatic solvent | 90–95 |
| Fumed silica having a specific surface area of at least 100 m$^2$/g | 1–4 |
| Oil-soluble surfactant having an HLB not greater than 12 | 3–6 |

(B) Allowing the stripper to contact the paint for a period of time sufficient to cause it to be dissolved from the surface; and then, (C) Removing the paint and stripper by means of water washing.

These compositions are useful in removing acrylic paints from paint spray booths.

5 Claims, No Drawings

FUMED SILICA AS A PAINT STRIPPER THICKENER

INTRODUCTION

Paint spray booths used to spray large objects such as automobile bodies, appliances and the like employ acrylic finishes either in the form of aqueous emulsions or as oil-based coating compositions. It is customary to clean these surfaces of paint spray booths by spraying the surfaces which have become coated with the acrylic finishes due to overspray with aromatic solvent paint strippers. These solvents are usually such aromatic hydrocarbon liquids as xylene, toluene or mixed aromatic compounds derived from the refining of petroleum.

These non-viscous solvents do not form a good adherent coating on the paint surfaces to which they are applied. To overcome this deficiency, it is customary to thicken these aromatic solvents.

The present invention is directed to an improved thickened paint stripper for acrylic paints which adhere to the surfaces of paint spray booths.

THE INVENTION

The invention comprises a method of removing acrylic paints from the surfaces of paint spray booths which comprises the steps of (A) Coating the painted surfaces of paint spray booths with a thickened aromatic solvent paint stripper consisting essentially of:

| Ingredients | % by weight |
| --- | --- |
| Aromatic solvent | 85–99.5 |
| Fumed silica having a specific surface area of at least 100 m$^2$/g | 0.5–5 |

A preferred composition is set forth below

| Ingredients | % by weight |
| --- | --- |
| Aromatic solvent | 90–95 |
| Fumed silica having a specific surface area of at least 100 m$^2$/g | 1–4 |
| Oil-soluble surfactant having an HLB not greater than 12 | 3–6 |

A most preferred composition is

| Ingredients | % by weight |
| --- | --- |
| Aromatic solvent | 85–98 |
| Fumed silica having a specific surface area of at least 100 m$^2$/g | 0.5–6 |
| Oil-soluble surfactant having an HLB not greater than 12 | 1–10 |

(B) Allowing the stripper to contact the paint for a period of time sufficient to cause it to be loosened from the surface; and then, (C) Removing the paint and stripper by means of water washing.

The compositions described in the above process are thought to be novel in and of themselves.

THE FUMED SILICA

These materials are well-known and are described in the technical publication entitled "Cab-O-Sil—How to Use it—Where to Sell It".

Fumed silicas of the type used in the practice of the invention are also described in the technical publication entitled "Technical Bulletin Pigments, AEROSIL as a Thickening Agent for Liquid Systems" No. 23, Degussa, C. 1987.

The fumed silica products described in these bulletins that are used in the practice of the invention are the hydrophillic, non-modified, finely divided silica particles made by the vapor phase process produced by hydrolysis at about 1,000° C. Preferred commercial materials are CAB-O-SIL M-5 and AEROSIL 200. The fumed silica used in the invention should have a specific surface area of m$^2$/gm (BET) at least 100 and preferably 200.

Additional properties of the preferred material, CAB-O-SIL M-5, is set forth below:

| CAB-O-SIL M-5 | |
| --- | --- |
| Properties variable by grade | |
| Surface area m$^2$/gm(BET) | 200 ± 25 |
| Particle size micron | 0.012 |
| 325 Mesh residue - max. (%) | 0.02 |
| Density lbs./cu. ft. | 2.3 max. |
| Ignition loss (1000° C. moisture-free basis) | 1% |
| pH (4% aqueous dispersion) | 3.5–4.2 |

The AEROSIL 200 has a specific surface area of 200 m$^2$/gm.

Dosage

These fumed silicas are used at dosages ranging between 0.5–8% and preferably 1–4% by weight of the aromatic solvent.

The Aromatic Solvent

This may be any aromatic hydrocarbon liquid as was described before, e.g. xylene, toluene and aromatic petroleum fractions.

The Oil Soluble Surfactant

These materials have an HLB not greater than 12 and preferably within the range of 7–12.

Surfactants of this type are described in *McCutcheon's Detergents & Emulsifiers, North American Edition*, published by McCutcheon Division, MC Publishing Co., 1978. For a more detailed description of HLB, see "The HLB System" published by ICI Americas, Inc., 1976. Both of these publications are incorporated herein by reference.

The Preferred surfactants are non-ionic.

| Compositions | | |
| --- | --- | --- |
| Ingredients | Preferred % by weight | Most Preferred % by weight |
| Aromatic solvent | 85–98 | 90–95 |
| Fumed silica having a specific surface area of at least 100 m$^2$/g | 0.5–6 | 1–4 |
| Oil-soluble surfactant having an HLB not greater than 12 | 1–10 | 3–6 |

| Specific Formula | |
| --- | --- |
| Ingredients | % by Weight |
| Aromatic 150 solvent | 93.998 |
| AEROSIL 200 (fumed silica) thickener | 2.0 |
| Ethoxylated nonyl phenol, 4 moles EO | 2.0 |
| Ethoxylated nonyl phenol, 10 moles EO | 2.0 |
| Oil blue dye ISOLVENT BLUE 96 * | 0.002 |

* Optional Ingredient

ADVANTAGES OF THE INVENTION & DISCUSSION

Aromatic solvents are effective, low cost solvents for application in paint strippers. A major limitation to their use has been in effectively thickening this solvent type to provide the desired:
(1) viscosity,
(2) thixotropy for clinging to vertical surfaces,
(3) rheology for atomization in spray applications, and
(4) water rinsability for removal.

Fumed silicas, such as Aerosil 200, can effectively thicken an aromatic solvent to provide these desired characteristics. At low concentrations of 1–4%, the silica thickens the solvent to a high viscosity without requiring a more expensive co-solvent as many other thickeners require. Thickening occurs through formation of a silica network produced by hydrogen bonding of the silanol groups on the silica particle. The resulting thickened solvent is highly thixotropic which enables the product to be easily sprayed by reduction of viscosity through shear and then quickly recovers viscosity to provide good vertical clinging on the substrate. Since the thickener is not polymeric, the material can be readily atomized for spray appliation. Also, a major advantage of the application of this thickener is that the formulated paint stripper can be easily rinsed off with water.

Other thickeners that have been evaluated or used for thickening aromatic hydrocarbon solvents for application as a paint stripper include hydroxypropyl methyl celluloses, ethyl cellulose, aluminum octoate, polyisobutylene, polyvinyl pyrrolidone, and a borosilicatate. In general, these thickeners either have required a high percentage of a more expensive co-solvent or did not provide the rheology and water rinsability vital in this application. Certain types of thickeners that would thicken the aromatic solvent such as the salts and high molecular weight, water insoluble polymers, were found to precipitate out onto the substrate when the paint stripper is rinsed with water to leave an unacceptable residue on the surface. The high molecular weight, water-soluble thickeners required co-solvents which significantly raises the cost of the product.

The compositions described above would be applied by spraying or any suitable means, most preferably spraying to the paint-contaminated surface of a spray booth. They would be allowed to contact the hardened or tacky surface for a period of time to loosen and dissolve it and then would be removed by spraying the paint coated surfaces with water.

Having thus described my invention, I claim:

1. A method of removing acrylic paints from the surfaces of paint spray booths which comprises the steps of
    (A) Coating the painted surfaces of paint spray booths with a thickened BTX aromatic solvent paint stripper consisting essentially of:

| Ingredients | % by Weight |
| --- | --- |
| Aromatic solvent | 85–99.5 |
| Fumed silica having a specific surface area of at least 100 m$^2$/g | 0.5–5 |

(B) Allowing the stripper to contact the paint for a period of time sufficient to cause it to be loosened from the surface; and then,
   (C) Removing the paint and stripper by means of water washing.

2. A method of removing acrylic paints from the surfaces of paint spray booths which comprises the steps of
    (A) Coating the painted surfaces of paint spray booths with a thickened BTX aromatic solvent paint stripper consisting essentially of:

| Ingredients | % by Weight |
| --- | --- |
| Aromatic solvent | 85–98 |
| Fumed silica having a specific surface area of at least 100 m$^2$/g | 0.5–6 |
| Oil-soluble surfactant having an HLB not greater than 12 | 1–10 |

(B) Allowing the stripper to contact the paint for a period of time sufficient to cause it to be loosened from the surface; and then,
   (C) Removing the paint and stripper by means of water washing.

3. A method of removing acrylic paints from the surfaces of paint spray booths which comprises the steps of
    (A) Coating the painted surfaces of paint spray booths with a thickened BTX aromatic solvent paint stripper consisting essentially of:

| Ingredients | % by Weight |
| --- | --- |
| Aromatic solvent | 90–95 |
| Fumed silica having a specific surface area of at least 100 m$^2$/g | 1–4 |
| Oil-soluble surfactant having an HLB not greater than 12 | 3–6 |

(B) Allowing the stripper to contact the paint for a period of time sufficient to cause it to be dissolved from the surface; and then,
   (C) Removing the paint and stripper by means of water washing.

4. A paint stripper composition consisting essentially of:

| Ingredients | % by Weight |
| --- | --- |
| BTX aromatic solvent | 85–98 |
| Fumed silica having a specific surface area of at least 100 m$^2$/g | 0.5–6 |
| Oil-soluble surfactant having an HLB not greater than 12 | 1–10 |

5. A paint stripper composition consisting essentially of:

| Ingredients | % by Weight |
| --- | --- |
| BTX aromatic solvent | 90–95 |
| Fumed silica having a specific surface area of at least 100 m$^2$/g | 1–4 |
| Oil-soluble surfactant having an HLB not greater than 12 | 3–6 |

* * * * *